April 24, 1945.　　　C. R. PATON　　　2,374,305
INTERNAL-COMBUSTION ENGINE
Filed April 19, 1943　　　3 Sheets-Sheet 1

April 24, 1945.  C. R. PATON  2,374,305
INTERNAL-COMBUSTION ENGINE
Filed April 19, 1943   3 Sheets—Sheet 3

INVENTOR.
CLYDE R. PATON
BY
Tibbetts & Hart
ATTORNEYS

Patented Apr. 24, 1945

2,374,305

UNITED STATES PATENT OFFICE 2,374,305

INTERNAL-COMBUSTION ENGINE

Clyde R. Paton, Birmingham, Mich., assignor to Packard Motor Car Company, Detroit, Mich., a corporation of Michigan Application April 19, 1943, Serial No. 483,667

4 Claims. (Cl. 123—119)

This invention relates to aircraft engines and more particularly to supercharger impeller drive mechanism and control for such mechanism.

Substantially all aircraft engines are equipped with superchargers for increasing the delivered power. In many instances the superchargers are equipped with driving mechanism for increasing the impeller speed at elevations where the engine power would otherwise drop off due to decreased air pressure.

It is an object of this invention to provide a change speed mechanism, for driving an aircraft engine supercharger impeller, with an automatic control for selecting the drive in response to air pressure conditions.

Another object of the invention is to provide an electric system under the control of an aneroid for automatically controlling change speed mechanism for driving an impeller of an aircraft engine supercharger.

Another object of the invention is to provide automatically operating mechanism for selectively establishing a plurality of aircraft engine supercharger drives through change speed gearing and for throttling down the engine prior to any changes in the driving ratio through the gearing.

Another object of the invention is to provide a change speed drive mechanism for an aircraft engine supercharger impeller that will be controlled automatically to operate in the lower speed ratio below a predetermined elevation and in the higher speed ratio above such predetermined elevation.

Other objects of the invention will appear from the following description taken in connection with the drawings, which form a part of this specification, in which.

Figure 1:
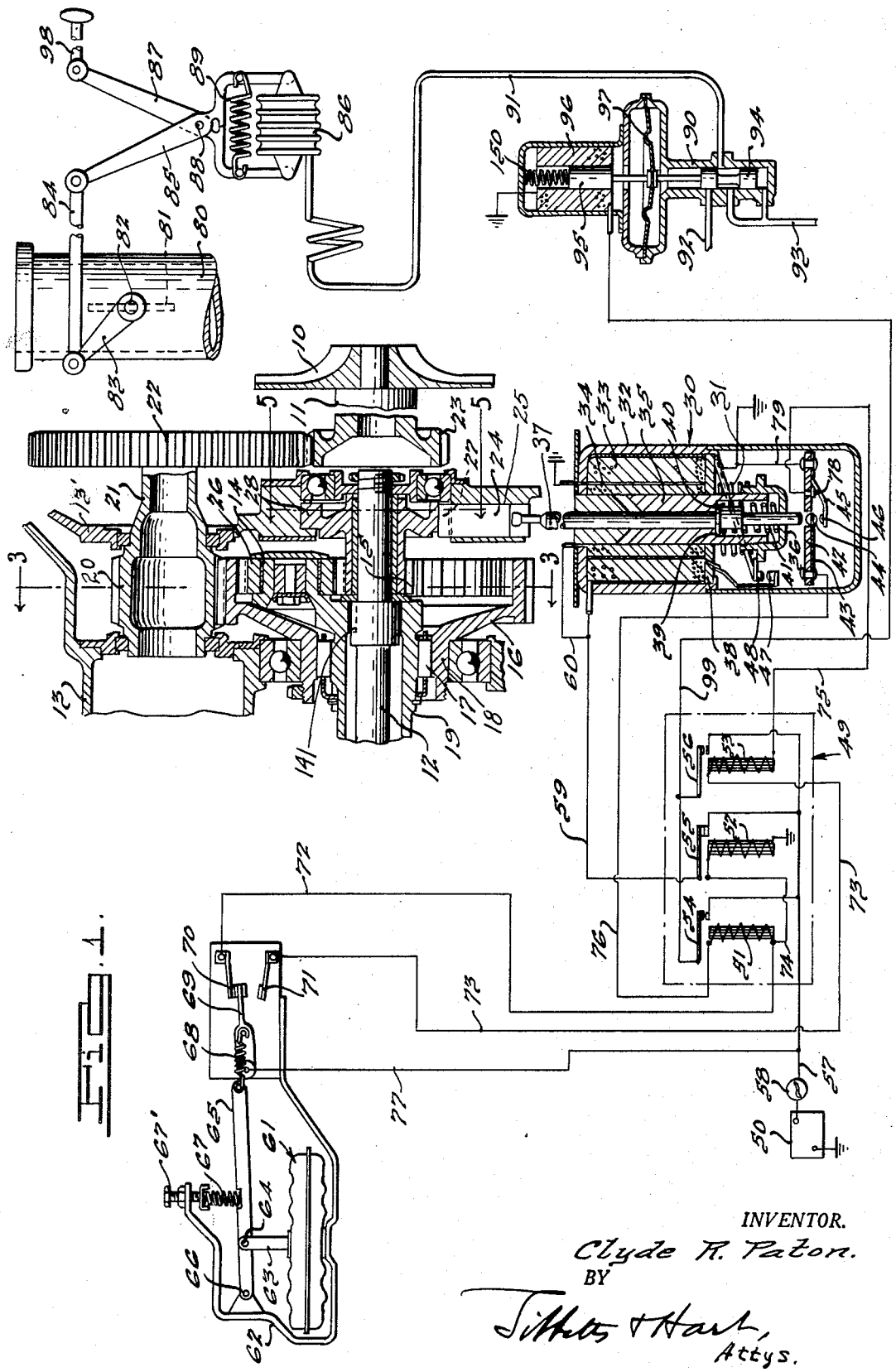
Fig. 1 is a sectional view of change speed drive gearing for operating an aircraft engine supercharger impeller and control mechanism for the gearing and the engine throttle valve shown diagrammatically.

The drawings show change speed mechanism for driving an internal combustion engine accessory, such as a supercharger impeller 10. The impeller is fixed to a driven impeller shaft 11 that aligns with drive shaft 12 suitably connected to be driven by the engine crankshaft (not shown). The drive shaft is connected in driving relation with the driven shaft by change speed mechanism that can be controlled to provide either one or two impeller driving ratios both of which are much higher than that at which the crankshaft rotates. Such mechanism is contained in the engine casing 13 and, as shown in Fig. 1, includes planetary gearing having a cage 14 carrying planet pinions 26, a sun gear 15 and a ring gear 16. The cage is fixed at 141 on drive shaft 12 while the sun gear is loosely mounted on such shaft. An overrunning clutch 17 is arranged between the hub 18 of the ring gear and a sleeve extension 19 on the cage so that when the sun gear is free to rotate, the clutch will lock the cage and ring gear together and thereby provide direct drive through the planetary gearing. The ring gear meshes with gears 20 on counter shafts 21 and gears 22 on such shafts mesh with gear 23 fixed on the impeller shaft. This gearing between the planetary gearing and the impeller shaft will increase the speed at which the impeller is driven several times more than the speed of the drive shaft.

In order to change the driving speed through the mechanism above that obtained when the overrunning clutch is effective, I provide means for braking or holding the sun gear. Such means may consist of a pawl 24 slidable in a slot 25 in wall 13' of the casing for engaging in recesses 27 in the periphery of hub 28 fixed to the sun gear. When the pawl is moved to engage in a recess in hub 28, the sun gear will be held stationary and thereby cause a step up of the driving speed through the mechanism. When the pawl is removed from holding engagement with the sun gear hub, the overrunning clutch will become effective to lock the planetary gearing to transmit direct drive between the drive shaft and the ring gear.

The pawl 24 can be actuated to engage or release the sun gear hub through motor means that can consist of a solenoid 30 and a spring 31. The solenoid has a casing 32 containing inner and outer coils 33 and 34, an armature 35 slidable in coil 34 and a cap 36 screwed on the armature. Rod 37 is attached to the pawl and extends through the armature and its cap. There is an insulation wall 38 across the solenoid casing and spring 31 seats against this wall and the armature cap. The armature is recessed and forms a seat 39 for engaging a flange 40 of the pawl rod and a coil spring 41 is arranged between the flange and the armature cap. The solenoid casing also has another interior insulation wall 42 through which the pawl rod can extend, such wall acting as a support for switch arm 43 carrying contact 44 and switch arm 45 carrying contact 46. Coil 33 connects at one end with contact 47 normally engaged by resilient contact 48 fixed on the wall 38. The armature cap 36 is formed and arranged to control engagement of the contact member 48 with contact 47.

The solenoid 30 is connected in an electric circuit having a battery 50 and a relay 49. There are three coils 51, 52 and 53 in the relay respectively controlling switches 54, 55 and 56. These switches are connected with conductor 57 leading from the battery and having a manually controlled switch 58 therein. Switch 55 is connected with the armature moving coil 33 in solenoid 30 by conductor 59 and conductor 60 connects armature holding coil 34 with conductor 59, the holding coil being grounded to complete the circuit when conductor 60 is energized.

The motor means, in this instance the solenoid and spring, is controlled by the electric circuit and relay which in turn is controlled by means responsive to pressure, such as aneroid 61 suitably secured on a support 62 mounted on or adjacent the engine. The free movable wall of the aneroid carries an arm 63 pivotally connected at 64 to lever 65 pivoted at 66 to support 62. Movement of the lever in response to expansion of the aneroid is opposed by spring 67 and the free end of the lever is connected by spring 68 to a pivoted switch arm 69. The spring force opposing operation lever 65 can be controlled by screw 67 to establish a desired predetermined pressure at which the aneroid is effective to bring in the higher driving speed. This aneroid controlled switch is of the overcenter type that will quickly shift the switch arm between contacts 70 and 71 when operated. Contact 70 is connected with relay coil 51 by conductor 72, contact 71 is connected with relay coil 53 by conductor 73, conductor 74 connects relay coils 51 and 52 and relay coil 53 is connected with contact 78 on wall 42 by conductor 75. Coil 51 is connected with switch 43 by conductor 76, switch 69 is connected with conductor 57 by conductor 77 and a grounded conductor 79 connects switches 45 and 48.

During operation of the engine, torque acts to hold the pawl engaged in braking position with the sun gear hub so that the spring 31 can not disengage the pawl until the engine is decelerated. Difficulty is also encountered in engaging the pawl with recesses 25 in the sun gear hub unless the engine is decelerated. In order to automatically decelerate the engine when shifting the pawl into or out of engagement, I provide throttle adjusting mechanism under control of the electric aneroid control system for the pawl controlling solenoid.

The engine fuel feeding conduit 80 has a conventional throttle valve 81 pivotally mounted therein on shaft 82 to which an arm 83 is fixed. Link 84 connects arm 83 with lever 85 pivotally connected to one end of a bellows 86. The other end of the bellows has a lever 87 pivoted thereto and a manually operable rod 98 is connected to this lever. Levers 85 and 87 are connected by pivot 88 and coil spring 89. The bellows is connected with a valve housing 90 by conduit 91 and a source of fluid under pressure, such as the engine lubricating system, is connected with the valve housing by conduit 92. An outlet or drain conduit 93 is also connected with the valve housing. The fluid flow to and from the bellows is controlled by valve 94 having a stem 95 serving as the armature of a control solenoid 96. The stem is fixed to a diaphragm 97 acting in conjunction with spring 150 to normally move the valve into position shutting off the fluid under pressure and opening the drain conduit to the bellows. The solenoid is grounded and is connected with switches 54 and 56 by conductor 99.

The control system for the change speed selection in the impeller drive mechanism is arranged to disengage the pawl 27 from the sun gear below some predetermined air pressure, for example the air pressure at 12,000 feet elevation, and to engage the pawl with the sun gear above such level as shown in Fig. 1. The aneroid will automatically function to provide these desired operating conditions. When the aneroid is contracted, due to air pressure below the predetermined elevation, with switch 58 closed, switch arm 69 will engage contact 71 and connect conductor 73 with the battery through conductors 77 and 57. One contact of switches 54, 55 and 56 will be connected with the battery through conductor 57. The pawl will be held in disengaged position by spring 31 and the pawl rod will extend through wall 42 and press switch 43 outwardly to a position moving switch 45 therewith out of engagement with contact 78, thus breaking the circuit to relay coil 53 which otherwise would be energized through conductor 79. As there is no current passing to coils 51 and 53, the switches 54 and 56 controlled thereby will be open and solenoid 96 will be deenergized so that valve 94 will be closed rendering the automatic throttle valve control device ineffective. As coil 52 is connected by conductor 74 with the conductor 72, the switch 69 being out of engagement with contact 70 will render the solenoid 30 ineffective and spring 31 will hold the pawl out of engagement with the sun gear. Under such condition, the overrunning clutch will lock the cage and the ring gear together for direct drive through the planetary gearing and the lower speed drive through the change speed mechanism will be had.

When the predetermined altitude is reached, the aneroid will expand, due to decreased air pressure, and will cause switch 69 to move away from contact 71 into engagement with contact 70. This will complete a circuit to coil 52 through conductors 72 and 74 causing switch 55 to close and thereby energizing solenoid coils 33 and 34. The circuit to grounded coil 34 is through conductor 57, switch 55 and conductors 59 and 60. The circuit to coil 33 is through conductor 57, switch 55, conductor 59, contact 47, switch arm 48 and conductor 79 to ground. Energizing coil 33 will move armature 35 upwardly which will bias spring 31 and will create pressure against spring 41 and urge the pawl toward the sun gear hub. This armature movement will move the arm 48 away from contact 47 deenergizing coil 33 but the coil 34 will still be energized and will hold the armature in its upper position until loaded spring 41 can engage the pawl with the sun gear hub. The sun gear is rotating at too great a speed for the pawl to be pushed into a recess in the hub and the engine throttle valve is temporarily closed automatically to slow down the sun gear speed so that the pawl can be projected to engage in the hub.

When the aneroid moves switch 69 into engagement with contact 70, coil 51 will be energized through a circuit completed by conductor 76, switch 43, switch 45 with which switch 43 is held in contact by the pawl rod, and grounded conductor 79. This energizing of coil 51 will close switch 54 completing the circuit to solenoid 96 which will move valve 94 to open conduit 92 to the Sylphon which acts on the associated linkage to shift the throttle valve toward closed position. When the engine slows down, the pawl can be moved into engagement with the sun gear hub by spring 41 and this releases switch 43 which then moves upwardly out of contact with switch 45 breaking the circuit to relay coil 51. Deenergizing coil 51 releases switch 54 breaking the circuit to solenoid 96 so that valve 94 will return to position closing the connection between conduit 92 and the bellows, whereupon the throttle will automatically be moved back to its open position as dictated by movement of the manual control lever 98.

When the elevation becomes less than 12,000 feet, the aneroid will shift switch 69 out of engagement with contact 70 and into engagement with contact 71 so that relay coil 52 is deenergized breaking the circuit to solenoid 30. Torque will hold the pawl in engagement with the sun gear hub despite the force exerted by spring 31 tending to dislodge the pawl, so it is necessary to again reduce the engine speed. Coil 53 will be energized through circuit consisting of conductors 57, 77, switch 69, conductors 73, 75, contact 78, switch 45 engaging contact 78 when released by the pawl rod and grounded conductor 79. This will close switch 56 connecting conductors 57 and 99 to energize solenoid 96 to move the valve 94 to allow conduit 92 to open to the Sylphon and actuate linkage closing the throttle valve. As soon as engine deceleration reduces torque to allow spring 31 to dislodge the pawl from the sun gear, the pawl rod will move switch 43 outwardly carrying switch 45 therewith and out of engagement with contact 78 to break the circuit through relay coil 53 so that switch 56 will open and deenergize solenoid 96. When such solenoid is deenergized, the throttle valve will be returned to open position dictated by the manual control.

Figure 2:
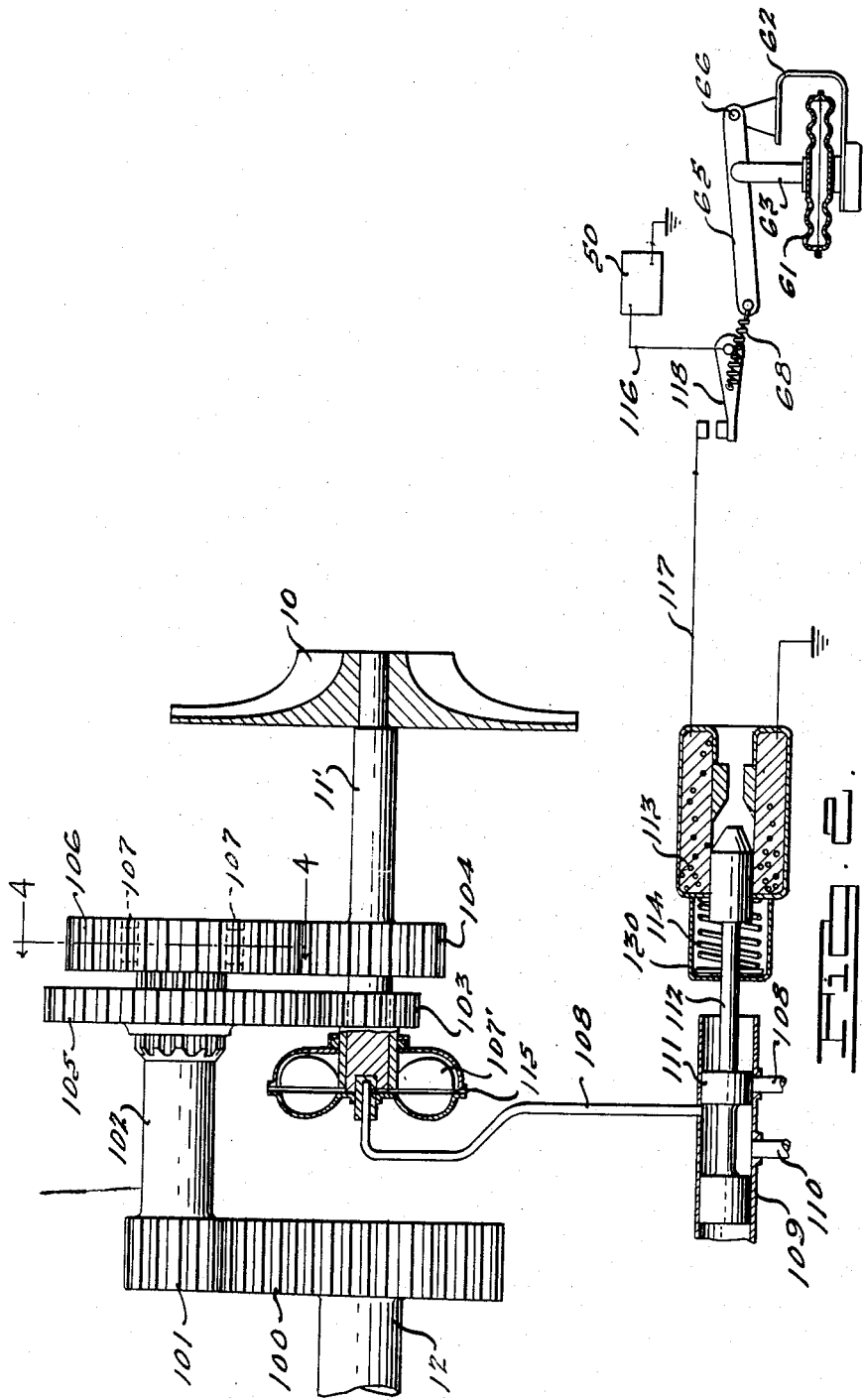
Fig. 2 is another form of the invention showing another type of change speed gearing and a means for controlling the drive through the gearing shown diagrammatically.
Figure 3:
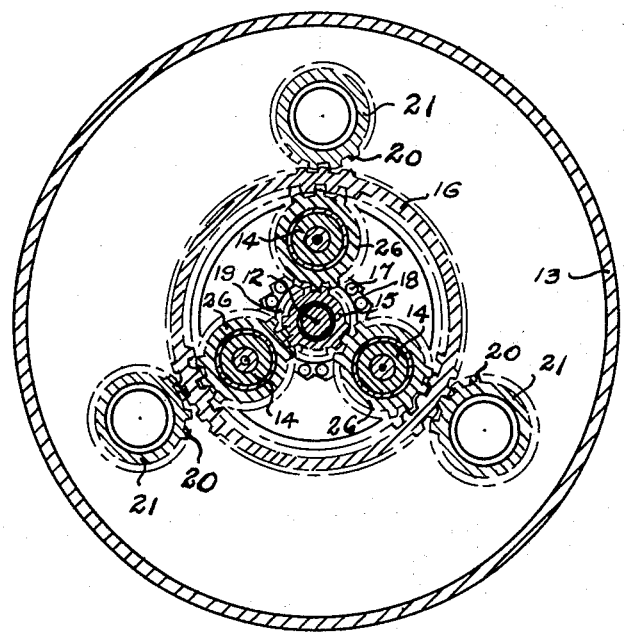
Fig. 3 is a sectional view through the gearing taken on line 3—3 of Fig. 1.
Figure 4:
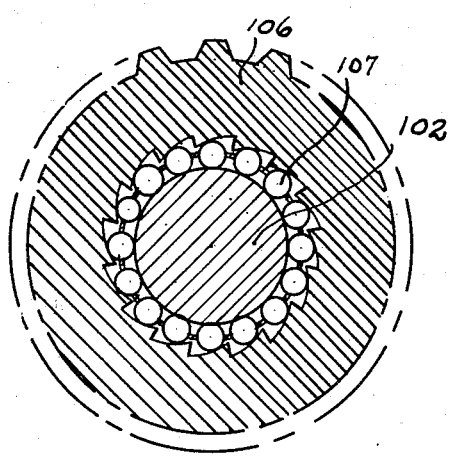
Fig. 4 is a sectional view of the gearing taken on line 4—4 of Fig. 2.
Figure 5:
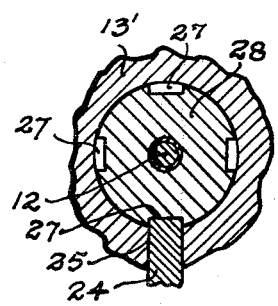
Fig. 5 is a fragmentary sectional view of the gearing control taken on line 5—5 of Fig. 1.

The impeller driving mechanism and the control thereof by an aneroid can take another form as evidenced by a modified form of the invention as shown in Fig. 2. In this embodiment, the crankshaft extension or drive shaft 12 has gear 100 fixed thereon and such gear meshes with gear 101 on a countershaft 102. The driven shaft 11 carrying the supercharger impeller 10 has gear 103 loosely mounted thereon and gear 104 fixed thereto. Gear 103 meshes with gear 105 fixed on the countershaft and gear 104 meshes with gear 106. An overrunning clutch 107 is arranged to drive gear 106 from the countershaft. When the overrunning clutch is effective, the lower speed drive will be effective, although such speed is several times faster than the crankshaft speed. To obtain a higher rate of driving speed for the supercharger impeller, a fluid clutch 107' is arranged to connect gear 103 with shaft 11' and when effective, drive through gear 106 will be ineffective due to the overrunning clutch.

The fluid clutch is connected with a source of fluid under pressure, which can be the engine lubricating system, by conduit 108. Flow through this conduit can be controlled by valve means 111 that can be shifted by an electric system under control of an aneroid. Valve housing 109 can be interposed in conduit 108 and has a drain conduit 110 connected therewith. The valve 111 has a stem 112 associated to be actuated by solenoid 113 to open conduit 108 and spring 114 acts against retainer 130 fixed on the valve to close conduit 108 and open the clutch to the drain conduit 110 when the solenoid is deenergized. The clutch has a bleed port 115 open to the casing housing the mechanism.

The solenoid is in an electric circuit consisting of battery 50, conductors 116 and 117, and a switch 118. The switch is opened and closed by an aneroid 61 and actuating mechanism similar to that described in connection with the invention shown in Fig. 1. When the aneroid is contracted it opens switch 118 so that the solenoid is deenergized and spring 114 will locate the valve in position shutting off fluid flow. Clutch 107' will then be ineffective and the lower speed drive through gears 106, 104 and the overrunning clutch 107 will be effective. Above the predetermined elevation, the aneroid will expand and close switch 118 which will close the circuit to the solenoid 113. Energizing solenoid 113 will shift valve 111 to open conduit 108 making clutch 107' effective to establish the higher speed drive through drivingly connecting gear 103 to shaft 11. It will be understood that various other types of clutching means could be used in place of the fluid clutch and could be controlled by the fluid pressure system just described.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In an aircraft engine, a throttle valve, a supercharger impeller, engine driven change speed mechanism normally operating in the lower speed range, means for shifting the drive through the mechanism to a higher speed range, means operable to close the throttle valve, an electric system controlling the throttle valve closing means and the shifting means for the change speed mechanism, and an aneroid controlling said electric system, said electric system acting to close the throttle valve momentarily whenever the drive through the change speed mechanism is being shifted.

2. In an aircraft engine, a supercharger impeller, engine driven change speed mechanism for driving the impeller, means controlling the engine power development, and means including an aneroid operable to control shifting of the drive through the change speed mechanism at some predetermined elevation and to momentarily reduce the engine power each time the drive ratio through the mechanism is changed.

3. In an aircraft engine, a manually controlled throttle valve, motor means for moving the valve in closing direction independently of the manual control, supercharger impeller drive mechanism having means for changing the drive therethrough, an electric system for controlling the motor means and the drive selecting means, and an aneroid controlling said electric system, said system energizing the motor means to momentarily reduce the engine power each time the selector means is operated to change the drive through the mechanism.

4. In an aircraft engine, a supercharger impeller, engine driven change speed mechanism connected to drive the impeller, a throttle valve, power operated means operable to move said valve toward closing position, a solenoid operated means controlling said power means, a solenoid operated means controlling the change speed mechanism to select the drive therethrough, an electric system including a switch and a relay connected with both solenoid operated means, and an aneroid controlling said switch, said relay being effective to control the power means solenoid to momentarily decelerate the engine each time the change speed solenoid is energized or deenergized, and to change the drive through the mechanism above and below a predetermined altitude.

CLYDE R. PATON.